United States Patent
Starita

(10) Patent No.: US 7,317,054 B2
(45) Date of Patent: *Jan. 8, 2008

(54) MELT BLENDED HIGH DENSITY POLYETHYLENE COMPOSITIONS WITH ENHANCED PROPERTIES AND METHOD FOR PRODUCING THE SAME

(75) Inventor: Joseph M. Starita, Marysville, OH (US)

(73) Assignee: Corrugated Polyethleyne Pipe, Ltd., Marysville, OH (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/188,193

(22) Filed: Jul. 22, 2005

(65) Prior Publication Data

US 2005/0261435 A1 Nov. 24, 2005

Related U.S. Application Data

(63) Continuation of application No. 10/337,084, filed on Jan. 6, 2003, now Pat. No. 7,196,138, which is a continuation-in-part of application No. 10/017,314, filed on Dec. 14, 2001, now Pat. No. 6,749,914.

(51) Int. Cl.
C08L 23/00 (2006.01)
C08L 23/04 (2006.01)
C08F 8/00 (2006.01)

(52) U.S. Cl. ...................... 525/191; 525/240

(58) Field of Classification Search ................ 525/191, 525/240
See application file for complete search history.

(56) References Cited

U.S. PATENT DOCUMENTS

| | | | |
|---|---|---|---|
| 4,374,227 A | 2/1983 | Michie, Jr. | |
| 4,461,873 A | 7/1984 | Bailey et al. | |
| 4,547,551 A | 10/1985 | Bailey et al. | |
| 4,824,912 A | 4/1989 | Su | |
| 4,829,839 A | 5/1989 | Fisher et al. | |
| 4,835,219 A | 5/1989 | Tajima et al. | |
| 5,189,106 A | 2/1993 | Morimoto et al. | |
| 5,338,589 A | 8/1994 | Bohm et al. | |
| 5,380,803 A | 1/1995 | Coutant et al. | |
| 5,494,965 A | 2/1996 | Harlin et al. | |
| 5,534,317 A | 7/1996 | Herman et al. | |
| 5,962,598 A | 10/1999 | Mack et al. | |
| 6,090,893 A | 7/2000 | Harlin et al. | |
| 6,194,520 B1 | 2/2001 | Cheruvu et al. | |
| 6,218,472 B1 | 4/2001 | Debras et al. | |
| 6,355,733 B1 | 3/2002 | Williams et al. | |
| 6,534,153 B1 | 3/2003 | Chu et al. | |
| 6,649,698 B1 | 11/2003 | Mehta | |
| 6,749,914 B2 | 6/2004 | Starita | |
| 7,196,138 B2 * | 3/2007 | Starita | ........................ 525/191 |
| 2005/0004316 A1 | 1/2005 | Starita | |

FOREIGN PATENT DOCUMENTS

| | | |
|---|---|---|
| EP | 0 273 284 A2 | 7/1988 |
| EP | 0 533 154 A1 | 3/1993 |
| EP | 1 146 077 A1 | 10/2001 |
| EP | 1 201 711 A1 | 5/2002 |
| WO | WO 00/24821 | 5/2000 |
| WO | WO 00/71615 A1 | 11/2000 |

* cited by examiner

Primary Examiner—Nathan M. Nutter
(74) Attorney, Agent, or Firm—Dinsmore & Shohl LLP

(57) ABSTRACT

Melt blended HDPE compositions for single and dual wall corrugated HDPE pipe and associated fabricated and molded fittings and accessories with enhanced physical properties and processing and environmental stress crack resistance (ESCR) characteristics and associated blend methods are disclosed in which virgin or recycled homopolymer and/or copolymer HDPE resin components are blended. The invention discloses methods for 1) selecting and determining the relative weight fractions of the HDPE blending components that provide specific physical properties and processability of HDPE blended compositions associated with density and melt index respectively and specific values of environmental stress crack resistance (ESCR) associated with specific molecular parameters and 2) for determining from molecular parameters, the ESCR of linear polyethylene resins and blended compositions within a class having similar densities. The invention reduces the cost of raw materials to corrugated HDPE pipe manufacturers by enabling the use of virgin prime commodity HDPE resins and/or wide and off specification prime HDFE resins in place of single stream specialty HDPE resins and favorably impacts the environment by providing the capability of utilizing recycled HDPE resins in place of prime HDPE resins in the manufacture of corrugated HDPE pipe.

15 Claims, 7 Drawing Sheets

MELT BLENDED HIGH DENSITY POLYETHYLENE COMPOSITIONS WITH ENHANCED PROPERTIES AND METHOD FOR PRODUCING THE SAME

CROSS REFERENCE TO RELATED APPLICATIONS

This application is a continuation of application Ser. No. 10/337,084, filed Jan. 6, 2003 now U.S. Pat. No. 7,196,138 as a continuation-in-part of application Ser. No. 10/017,314, "Melt Blended High Density Polyethylene Compositions With Enhanced Properties and Method for Producing the Same" filed on Dec. 14, 2001 (now U.S. Pat. No. 6,749,914) and application Ser. No. 10/194,136, "Melt Blended High-Density Polyethylene Compositions with Enhanced Properties and Method for Producing the Same filed on Jul. 12, 2002 (now abandoned), both incorporated by reference herein as if set forth in full. Cross-reference is made to related applications Ser. No. 11/035,679 filed Jan. 13, 2005 and Ser. No. 10/862,273 filed Jun. 7, 2004.

FIELD OF THE INVENTION

The present invention addresses the compositional needs of corrugated high-density polyethylene (HDPE) pipe utilized for drainage, irrigation, storm and sanitary sewer applications. Poor environmental stress crack resistance (ESCR) of corrugated high-density polyethylene has impeded the corrugated polyethylene pipe industry from effectively competing against polyvinylchloride (PVC), concrete and corrugated metal pipe. Due to insufficient ESCR, corrugated plastic pipe fabricated from high-density polyethylene often cracks before, during or shortly after being installed in a trench and back filled. This problem caused the American Association of State Highway Transportation Officials (AASHTO) to establish a minimum ESCR requirement. Until now the corrugated polyethylene pipe industry relies on specially reacted, single stream, prime virgin HDPE for raw material supply. This application discloses compositions having specific range of molecular properties, densities, and melt flow index (MI), and the methods for selecting, formulating, and melt blending said compositions composed of prime, wide and off specification virgin and post consumer and industrial recycled, reprocessed and regrind HDPE in order to comply with the performance standards of AASHTO.

The invention provides the benefit to the manufacturer of corrugated HDPE pipe of utilizing low cost raw materials in place of specialty HDPE's. The AASHTO performance standards include specifications for density, MI, flexural modulus, tensile strength and ESCR of the pipe compounds and are incorporated herein by reference. In addition, this invention discloses a method of utilizing specific molecular properties of the resulting blend to control the ESCR of HDPE blends having similar and predetermined MI and density. The benefit of this method is that it provides, a priori, a means of determining the ESCR of HDPE blends utilizing wide and off specification virgin HDPE resins as well as post consumer and post industrial recycled HDPE components.

Presently, the corrugated polyethylene pipe industry consumes approximately two billion pounds annually of virgin HDPE resins. This application discloses compositions and methods of evaluating and selecting recycled HDPE components that when blended and fabricated into corrugated pipe exhibit the same or improved properties of pipe fabricated from virgin prime ESCR grade HDPE resin. The utilization of significant amounts of recycled HDPE has the effects of lowering the cost of corrugated polyethylene pipe and significantly reducing the amount of virgin polyethylene consumed annually in drainage and sanitary sewer applications. This application also teaches that rheological transform methods can be utilized to generate the molecular parameters required to determine the ESCR of HDPE compositions.

In brief, the invention provides melt blended HDPE compositions for single and dual wall corrugated HDPE pipe and associated fabricated and molded fittings and accessories with enhanced physical properties and processing and environmental stress crack resistance (ESCR) characteristics and associated blend methods in which virgin or recycled homopolymer and/or copolymer HDPE resin components are blended. The methods include 1) selecting and determining the relative weight fractions of the HDPE blending components that provide specific physical properties and processability of HDPE blended compositions associated with density and melt index respectively and specific values of environmental stress crack resistance (ESCR) associated with specific molecular parameters and 2) determining from molecular parameters, the ESCR of linear polyethylene resins and blended compositions within a class having similar densities. The invention reduces the cost of raw materials to corrugated HDPE pipe manufacturers by enabling the use of virgin prime commodity HDPE resins and/or wide and off specification prime HDPE resins in place of single stream specialty HDPE resins and favorably impacts the environment by providing the capability of utilizing recycled HDPE resins in place of prime HDPE resins in the manufacture of corrugated HDPE pipe.

BACKGROUND AND SUMMARY OF INVENTION

The AASHTO standards for corrugated polyethylene pipe typically require the pipe be fabricated from HDPE. Current AASHTO standards require the polyethylene compositions comply with cell classification of 335400C according to ASTM D-3350. The cell classification of 335400C requires a maximum MI at 190 degrees Centigrade as per ASTM D1238 of 0.4 grams per ten minutes, a density of 0.945 to 0.955 grams per cubic inch as per ASTM D1505, minimum flexural modulus of 110,000 pounds per square inch according to ASTM D790 and minimum tensile strength of 3,000 pounds per square inch according to ASTM D638 and a minimum environmental stress crack resistance of 24 hours determined by a notched constant tensile load (NCTL) of 15% of the yield stress of the polyethylene tested as per ASTM D5397. These polyethylene compositions have an additional AASHTO requirement requiring the addition of at least 2% by weight of carbon black particles for ultra-violet resistance. Equally, important, the California State Department of Transportation (DOT) and AASHTO are considering requiring service life specifications for corrugated polyethylene pipe used for drainage as per test method for hydrostatic design basis for thermoplastic pipe, ASTM D2837. This means that existing polyethylene resins and blends of polyethylene resins are not capable of providing sufficiently enhanced ESCR. New grades of HDPE that are expected to be costly and/or new blends of commercially available polyethylene are required to satisfy the more stringent ESCR tests such as the Pent test, ASTM F1473, and test method for time-to-failure of plastic pipe under constant internal pressure, ASTM D1598.

Typically, corrugated polyethylene pipe manufacturers utilize specialty blow-molding grades of high-density polyethylene prepared in reactors by material suppliers and having bimodal or multi-modal molecular weight distributions. Debras et al. in U.S. Pat. No. 6,218,472 disclosed such a polyethylene composition which satisfies the current AASHTO standards and which is produced by means of a multi stage polymerization. The disadvantage of this approach is that the pipe manufacturer typically pays a premium for as polymerized virgin corrugated pipe grade high-density polyethylene and can not easily modify the physical properties of the polyethylene composition to enhance the physical properties or processability in relation to the pipe size and profile shape. Ideally, the corrugated pipe manufacturers would prefer to purchase lower cost prime (commodity polyethylene), wide and/or off specification virgin and/or post consumer and industrial recycled, reprocessed polyethylene components that they blend to meet the appropriate AASHTO standards.

Blending approaches have been disclosed. For example, Michie, Jr., U.S. Pat. No. 4,374,227, discloses medium density polyethylene pipe blends with improved low temperature brittleness properties and gloss which are composed of HDPE, LLDPE and a carbon black concentrate. Michie, Jr. discloses a thermoplastic Medium Density Polyethylene (MDPE) composition having a nominal density of 0.926 to 0.940 grams per cubic centimeter. Unfortunately, this approach has the disadvantage of too low a density to meet the cell classification of 335400C according to ASTM D-3350 for corrugated and profile HDPE pipe. Similarly Boehm et al. in their U.S. Pat. No. 5,338,589 and Morimoto et al. in their U.S. Pat. No. 5,189,106 disclose MDPE having density ranges of 0.930 to 0.940 grams per cubic centimeter. Boehm et al. and Morimoto et al. both utilize specific and different two-stage polymerization processes to produce blending components for the resulting medium density polyethylenes. The disadvantage of this approach is that it is limited to medium density polyethylene and excludes the high-density polyethylene density range of 0.945 to 0.955 grams per cubic centimeter required for corrugated and profile polyethylene pipe. Su in U.S. Pat. No. 4,824,912 discloses terblends of a major portion of LLDPE and minor amounts of HDPE of low molecular weight and of HDPE having high molecular weight. This approach also has the same disadvantage of being limited to low and medium density polyethylene compositions.

The object of this invention is to produce blends of commodity HDPE components that provide corrugated HDPE pipe compositions having a density range of about 0.951 to about 0.954 grams per cubic centimeter and MI in the range of about 0.15 to about 0.35 with ESCR in the range of about 24 to about 500 hours as measured by a NCTL ASTM D5397 procedure or equivalent range of ESCR values as measured by any other methods, for example, notched constant stress ligament (NCSL). Generally, commercially available HDPE copolymers polymerized to produce blow-molding grades of HDPE are often utilized for corrugated pipe. Several commercially available HDPE copolymer blow molding grades similar to Chevron Phillips 5202 HDPE grade comply with AASHTO standards for density, MI, flexural modulus and tensile strength but fail the environmental stress crack resistance (ESCR) requirements for NCTL ASTM D5397. The low ESCR is due to their characteristic broad molecular weight distribution (MWD) that includes low molecular weight fractions.

A further object of this invention is to disclose methods of selecting blend compositions of prime, wide and off specification and regrind virgin resins and post industrial and consumer recycled, reprocessed and regrind polyethylene resins that enhance ESCR of HDPE pipe blends by increasing the number of tie molecules between crystalline lamellae and thereby decreasing the number of molecular loose ends. The number of molecular loose ends is decreased by reducing number of shorter polyethylene molecules by melt blending polyethylene with sufficiently high molecular weight to provide exceedingly high ESCR with low molecular weight polyethylene components having narrow molecular weight distributions to provide improved processability. The methods disclosed in this invention are applicable to medium and high density polyethylene blend compositions having a density range of 0.94 to 0.954 grams per cubic centimeter. It is an additional object of this invention to disclose the specific molecular parameters required to select both the high molecular weight and the low molecular weight polyethylene components so that the number of loose ends associated with the short molecules are minimized and the physical properties of the blend composition meets the desired performance standards.

It is a further object of this invention to disclose lower cost HDPE compositions for corrugated plastic pipe than as polymerized polyethylenes having multimodal molecular weight distributions. In this regard, the invention discloses a method of varying the composition of high density polyethylene components having sufficiently different values of density and melt index such that the density and melt index of the blended composition can be varied independently to attain enhanced physical properties and processability respectively while maintaining an enhanced environmental stress crack resistance.

It is an additional object of this invention to provide HDPE pipe material with enhanced ESCR and long-term stress crack resistance by selecting a high molecular weight (HMW) HDPE component having a minimum value of the number average molecular weight so as to diminish the low molecular weight fraction of resulting blends with low molecular weight (LMW) HDPE components.

Enhanced physical properties such as flexural modulus and tensile strength are obtained by utilizing LMW HDPE homopolymer component having a characteristic narrow molecular weight distribution and higher density than the HMW HDPE component. Enhanced processability is obtained by utilizing low molecular weight HDPE copolymer component having a characteristic narrow molecular weight distribution devoid of short molecules and sufficiently high melt index to improve processability without dramatically greatly decreasing the ESCR.

It is the further objective of this invention is to provide the corrugated HDPE pipe and fittings manufacturers, the opportunity to vary the blend ratios of prime, wide and off specification and regrind virgin and post industrial and consumer recycled, reprocessed and regrind HMW and LMW HDPE's to obtain the required combination of physical and process properties of pipe and fittings. For example the pipe manufacturer may vary blend ratios to enhance 24-hour impact behavior of the pipe, ESCR and flexural stiffness by specific pipe diameter and corrugation design.

The invention provides the benefit of blending of prime, wide and off specification and regrind virgin and post industrial and consumer recycled, reprocessed and regrind HMW and LMW HDPE's to provide corrugated HDPE pipe and associated fittings and accessories material compositions having enhanced physical properties and processing characteristics that meet and exceed AASHTO standards.

The invention is described more fully in the following description of the preferred embodiment considered in view of the drawings in which:

DESCRIPTIONS OF THE FIGURES

DETAILED DESCRIPTION OF THE INVENTION

A polyethylene composition according to this invention is a melt blend of HDPE resins for use in manufacturing but not limited to corrugated polyethylene pipe, fittings and accessories. Applications for the polyethylene pipe, fittings and accessories include but are not limited to drainage, storm sewer, sanitary sewer, irrigation, industrial chemical and animal waste sewer applications. The composition of HDPE is disclosed for pipe and fitting material having a number average molecular weight ($M_n$) in the range of about 25,000 to 50,000 grams/mole and a polydispersity index (PI) or ratio of the weight average molecular weight ($M_w$) to the number average molecular weight ($M_n$) between about 5 and 12 resulting in a melt blend having density of about 0.951 to about 0.954 grams per cubic centimeter, an MI in the range of about 0.15 to 0.35 grams per 10 minutes according to ASTM D1238, a flexural modulus of at least 180,000 pounds per square inch and ESCR in the range of about 24 to 500 hours as measured by a NCTL procedure or equivalent range of ESCR values as measured by any other methods, for example, NCSL.

The HDPE blend composition may include prime, wide and off specification and regrind virgin and post industrial and consumer recycled, reprocessed HDPE in pellet, flake, powder or regrind form.

This invention also discloses the method of producing the compositions which include the means of selecting, formulating and blending the HMW HDPE copolymer, LMW HDPE homopolymer and/or LMW HDPE copolymer that provide the means of independently varying physical properties such as density and those properties associated with density, processability such as MI and ESCR.

Figure 1:
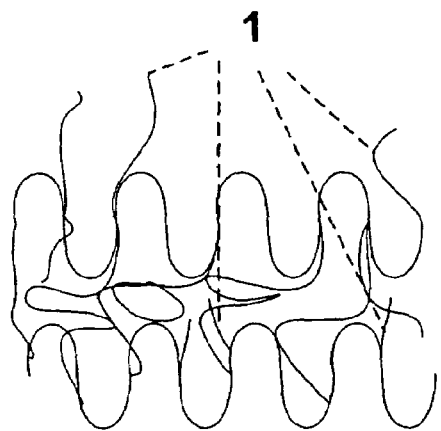
FIG. 1 shows a two dimensional representation of an unstressed HDPE lamellae.
Figure 2:
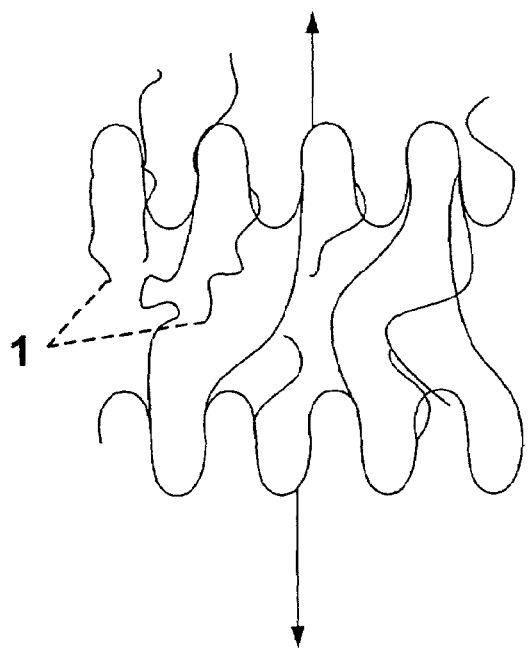
FIG. 2 shows a two dimensional representation of HDPE lamellae undergoing low tensile stress.
Figure 3:
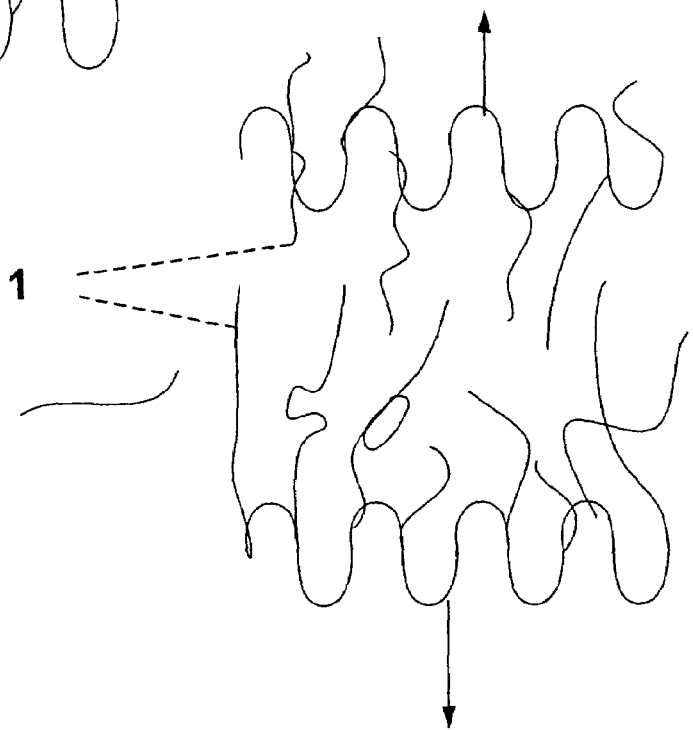
FIG. 3 shows a two dimensional representation of HDPE lamellae undergoing stress cracking due to application of low tensile stress over time.

The microstructure of HDPE is a series of lamellae (platelets) of folded molecules with molecular loose ends 1 dangling outside the lamellae and often entangled in the adjacent lamellae, as shown in FIG. 1. As presented by A. Lustiger ("Slow Crack Growth in Polyethylene", Proceedings of the Eighth Plastic Fuel Gas Symposium, American Gas Association, Columbus, Ohio, pp. 54-56) when a low stress is applied (FIG. 2) the linking chains have time to slowly disentangle themselves so that separation of the lamellae occurs, generating a smooth break or crack (FIG. 3).

Components of the polyethylene composition may include but are not limited to virgin pellets, virgin powder, virgin flake, recycled, reprocessed, regrind, off specification and wide specification grades of HDPE. This invention discloses the criteria for blending the HDPE components regardless of the grade utilized. In this way the manufacturer has the capability of selecting the most cost effective grade of HDPE.

It is known that corrugated polyethylene pipe composition may include additives such antioxidants, stabilizers and carbon black as typical examples in amounts of up to about 5% or more by weight.

The HDPE components in the form of virgin or reprocessed pellets, powder, flake or regrind are melt blended together, for example in an extruder or other mixer in a known manner. Virgin polyethylene components are commercially available from, e.g., Exxon Mobil (Irving, Tex.), Chevron Phillips Chemical Company LP (Houston, Tex.), Dow Chemical Company (Midland, Mich.), Formosa Plastics Company, (Houston, Tex.), and Huntsman Corporation (Houston, Tex.).

As referred to herein, density, MI and ESCR measurements are obtained in accordance with standard criteria determined by AASHTO and ASTM.

The enhancement of the environmental and long-term stress crack resistance of polyethylene is based on an increase in the number of tie molecules connecting the crystalline lamellae of the semi crystalline high-density polyethylene pipe material. In this regard, the number of tie molecules is inversely related to low molecular weight fraction of polyethylene. In other words, low molecular weight polyethylene molecules associated with broad molecular weight distribution (MWD) high-density polyethylene diminish the number of tie molecules between lamellae and has the effect of decreasing the stress crack resistance.

Until the present invention, pipe manufacturers have had to rely on expensive specially polymerized HDPE to satisfy standards for physical properties of pipe. Conventional commodity unimodal HDPE has been unsatisfactory for use because of its broad molecular weight distribution, which includes a low molecular weight fraction (FIG. 4) that contributes to failure of the ESCR test as AASHTO requirements. As polymerized multi-modal, single stream HDPE (FIG. 5) are high cost specialty products having less of a low molecular weight fraction than the unimodal HDPE so that the ESCR requirement of 24 hours as per ASTM 5397 for Notched Constant Tensile Load test (NCTL) is marginally exceeded by about 5 to about 15 hours. If sections of the fabricated pipe are tested in lieu of the HDPE composition before manufacturing the pipe, the 5 to 15 hour margin of safety may be reduced or eliminated. The presence of carbon black and the adverse effects of the processing history cause the reduction in ESCR.

Figure 11:
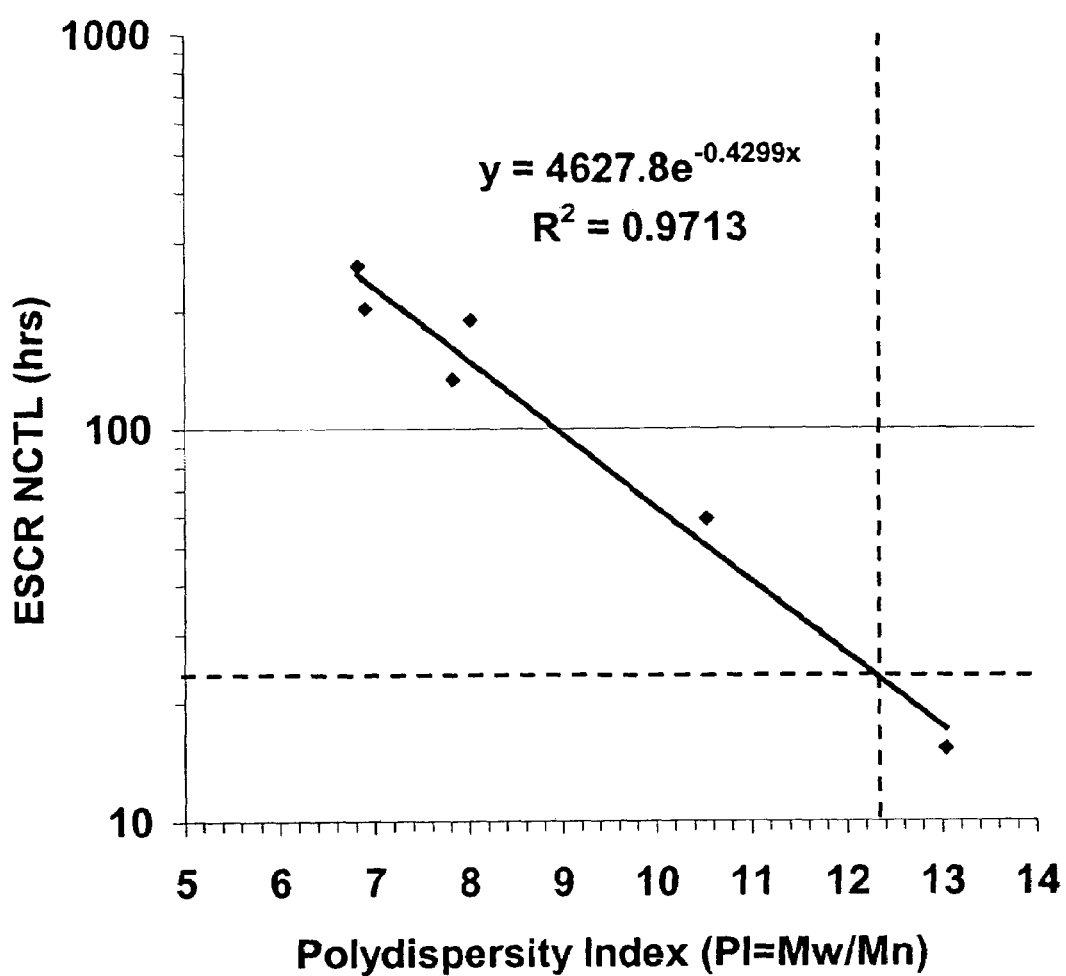
FIG. 11 shows a semi-log relationship between the ESCR and the ratio of the weight average molecular weight and the number average molecular weight for six HDPE blends.

Since there are no reported means of predicting ESCR and no blending rules, manufacturers of corrugated pipe must measure the value of ESCR for each blend recipe. Subsequently, the HDPE composition of concern is subjected to a test method such as the one for notched constant tensile load, NCTL ASTM D5397, notched constant ligament stress, NCLS ASTM F2136, the Pent test ASTM F1473 or ASTM D1598. These test methods require specific procedures for molding and preparing plaques and/or pipe, cutting specimens from the plaques or pipe, tensile tests of specimens to determine yield, generating a notch in the specimen and applying stress on the sample in the presence of a stress cracking agent and controlled temperature until the specimens fail. Typically the ESCR procedures take a minimum of two days to a week to get results and require at least five test stations per sample. The time delay, labor and equipment costs associated with ESCR tests combine with the iterative nature of blending to make it impractical and cost prohibitive for the manufacturers to rely on ESCR tests for quality control on non-prime feed stocks. For example, a pipe manufacturer who purchases virgin prime HDPE resins that have reliably consistent physical properties from lot to lot of the raw material, the problem is not as severe since once the recipe is set the quality can be assured by periodic testing of the composition. However if the manufacturer endeavors to utilize wide and off specification or recycled HDPE resins having physical properties such as density and MI, molecular weight and the shape of the molecular weight distribution that vary from lot to lot, the quality control problem is enormous. In this regard, this invention discloses means of accurately predicting ESCR values from molecular properties of the blend. The molecular properties of the blend composition can be generated in a number of traditional means or derived from rheological characterization of the blends and the blend components. FIG. 11 shows a plot for the six HDPE compositions shown below. The ESCR was measured utilizing the NCTL ASTM D5397 procedure. The polydispersity index (PI) is equal to the ratio of the weight average molecular weight ($M_w$) to the number average molecular weight ($M_n$).

| Sample Number | MI (grams/10 minutes) | Density (grams/cm$^3$) | Measured NCTL (Hours) | PI = Mw/Mn |
|---|---|---|---|---|
| 1 | 0.2 | 0.953 | 188.8 | 8.01 |
| 2 | 0.2 | 0.953 | 17.5 | 13.04 |
| 3 | 0.2 | 0.953 | 202.5 | 6.90 |
| 4 | 0.2 | 0.953 | 59.0 | 10.53 |
| 5 | 0.2 | 0.953 | 260.0 | 6.82 |
| 6 | 0.2 | 0.953 | 134.0 | 7.82 |

The Density varies with degree of crystallinity and the MI varies inversely with the molecular weight. Therefore, to obtain a control for the morphology and molecular weight of the six HDPE compositions, the density and MI were respectively held constant. Because the environmental stress crack resistance is generally understood and accepted by the scientific community to depend on the morphology or more specifically the degree of crystallinity, molecular weight and molecular weight distribution, the two former factors were held constant and the relationship to the latter factor, the molecular weight distribution was determined. The relationship between the ESCR and the molecular weight distribution was found to be logarithmic as demonstrated in FIG. 11 and is expressed by the following ESCR-PI algorithm:

$$ESCR = Ae^{-B(PI)}$$

where $PI = M_w/M_n$; $M_w$ = weight average molecular weight; $M_n$ = number average molecular weight; and A and B are constants determined from $ESCR = Ae^{-B(PI)}$ and known ESCR and PI values for any two compositions having similar density and MI values.

The polydispersity index is defined as $PI = M_w/M_n$ is one of the generally accepted measurements of the width of the distribution. The higher the value of PI, the broader the molecular distribution. In addition to $PI = M_w/M_n$, there are other ratios that indicate the breadth of the molecular weight distributions. Other ratios, for example those that include Z average and Z+1 average molecular weights, do not correlate to ESCR. The utilization of the polydispersity index ($PI = M_w/M_n$) in conjunction with blend compositions having similar values of density and MI provides a measure of the low molecular content of the blend compositions. The lower the PI, the less low molecular weight molecules, resulting in more tie molecules and higher ESCR.

The ESCR-PI algorithm can be utilized for quality assurance of the pipe product and criteria for selecting blend component formulations. The ESCR can be determined by the ESCR-PI algorithm when the values of $M_w$ and $M_n$ of the blend are known. Unfortunately, the determination of $M_w$ and $M_n$ by conventional analytical instrumentation such as Gel Permeation or Size Exclusion Chromatography and Osmometry requires dissolving the polyethylene in high temperature chlorinated solvents such as trichlorobenzene. This sample preparation is time consuming, the instrumentation expensive and requires laboratory safety procedures to protect the operator from inhaling the hazardous vapors.

For these reasons, the preferred embodiment determines $M_w$ and $M_n$ by transformation of dynamical mechanical, relaxation time, retardation time spectra generated from melt rheological measurements that respectively include frequency sweeps of dynamic mechanical inphase and out of phase moduli, stress relaxation and creep measurements. In this case, the HDPE composition and/or components are melted at a temperature above the melt point and below temperatures that quickly degrade HDPE.

An example would be subjecting the HDPE sample at 190 degrees centigrade to a sinusoidal shear strain at approximately 5% strain amplitude and varying the frequency of the sinusoidal oscillation over a frequency range while determining the elastic or in-phase and viscous or out of phase moduli from the sinusoidal stress output. This spectrum of mechanical response as a function of temperature and frequency can be transformed into molecular weight distribution functions from which $M_w$ and $M_n$ can be calculated. A preferred transform stores a collection of mechanical spectra and the related molecular weight distributions and by combining iterative, interpolating and comparing schemes, the unknown molecular weight distribution is determined.

Other methods utilize the relaxation time spectra derived from stress relaxation/step strain experiments and retardation time spectra derived from creep experiments. The relaxation and retardation time spectra are mapped to molecular weight distribution by the means of molecular models. There are numerous other methods that include Fourier transform analysis of arbitrary waveform perturbations such as step and cosine pulses. Typical melt rheological characterization that provides sufficient data to generate accurate $M_w$ and $M_n$ require less than two hours and little or no sample preparation.

Figure 4:
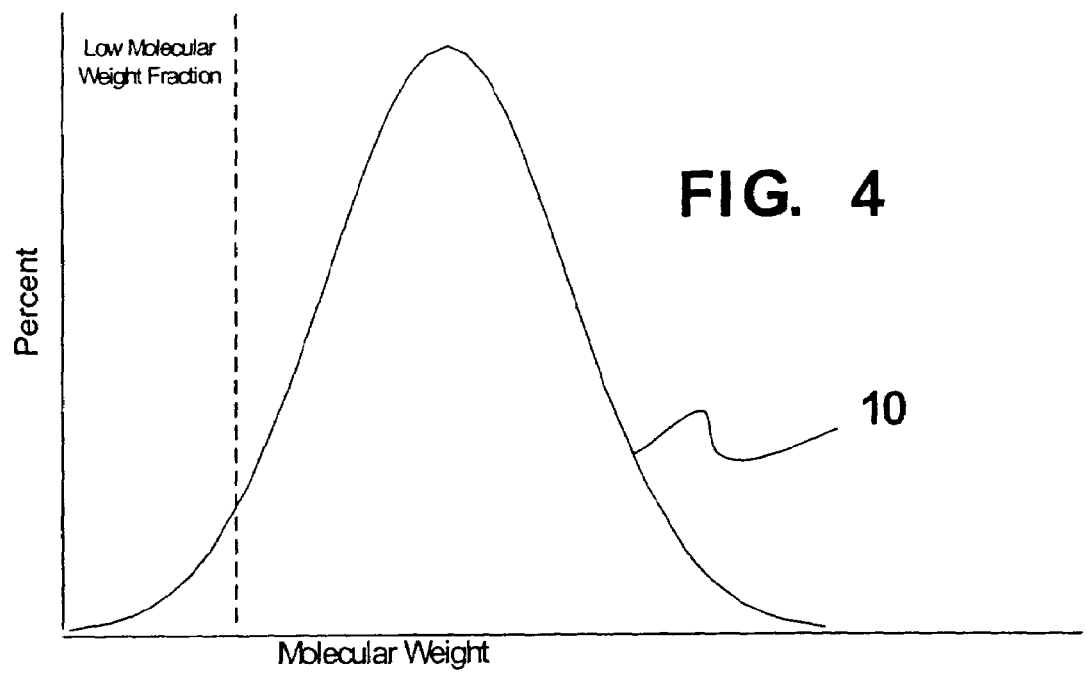
FIG. 4 shows the molecular weight distribution for a typical unimodal HDPE copolymer utilized for corrugated HDPE pipe having low ESCR
Figure 5:
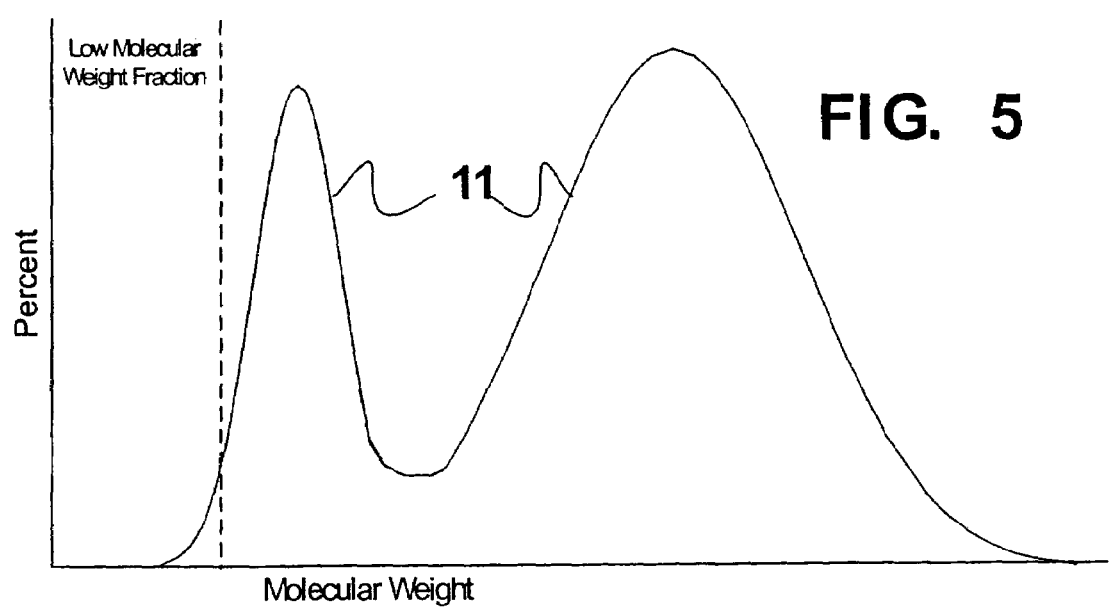
FIG. 5 shows a molecular weight distribution for a typical commercially available as polymerized bimodal HDPE copolymer.
Figure 6:
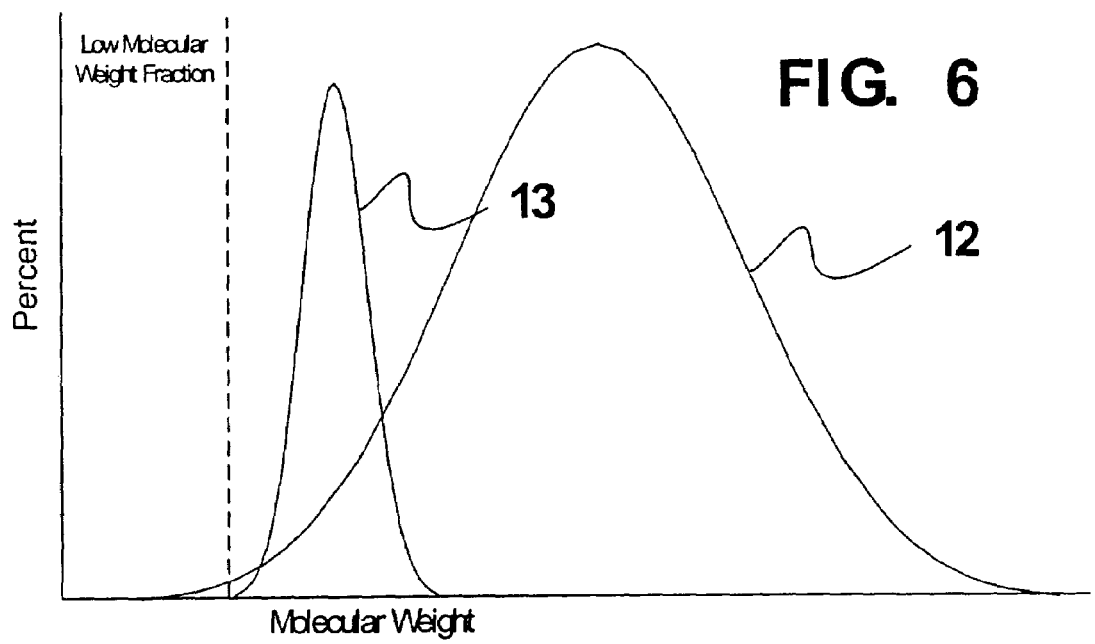
FIG. 6 shows the molecular weight distribution for a unimodal HMW HDPE and low molecular weight narrow molecular distribution HDPE.

An embodiment of the invention provides for the principal component of the blend to be a HMW HDPE 12 shown in FIG. 6 such as a blow molding resin used for drums or gas tanks having a broad unimodal molecular weight distribution, e.g., Chevron Phillips Marlex® HXM 50100-02. An alternate source may be recycled or regrind 50 gallon drums or gas tanks. The major component of HMW HDPE 12 in FIG. 6 has a molecular weight sufficiently high to reduce the low molecular weight fraction as compared to a typical blow molding resin 10 (FIG. 4). To adjust processability and performance, a mixture of low molecular weight HDPE homopolymers and copolymers 13 (FIG. 6) having a narrow molecular weight is blended with the HMW HDPE copolymer 12 in FIG. 6 to obtain the desired MI and density of the blend 14 shown in FIG. 7. The molecular weight distribution of the resulting polyethylene composition is bimodal or multimodal, having a much reduced low molecular weight fraction as compared to a typical blow molding grade unimodal copolymer 10 and the as polymerized specialty multi-modal copolymer 11 shown in FIGS. 4 and 5 respectively.

Figure 9:
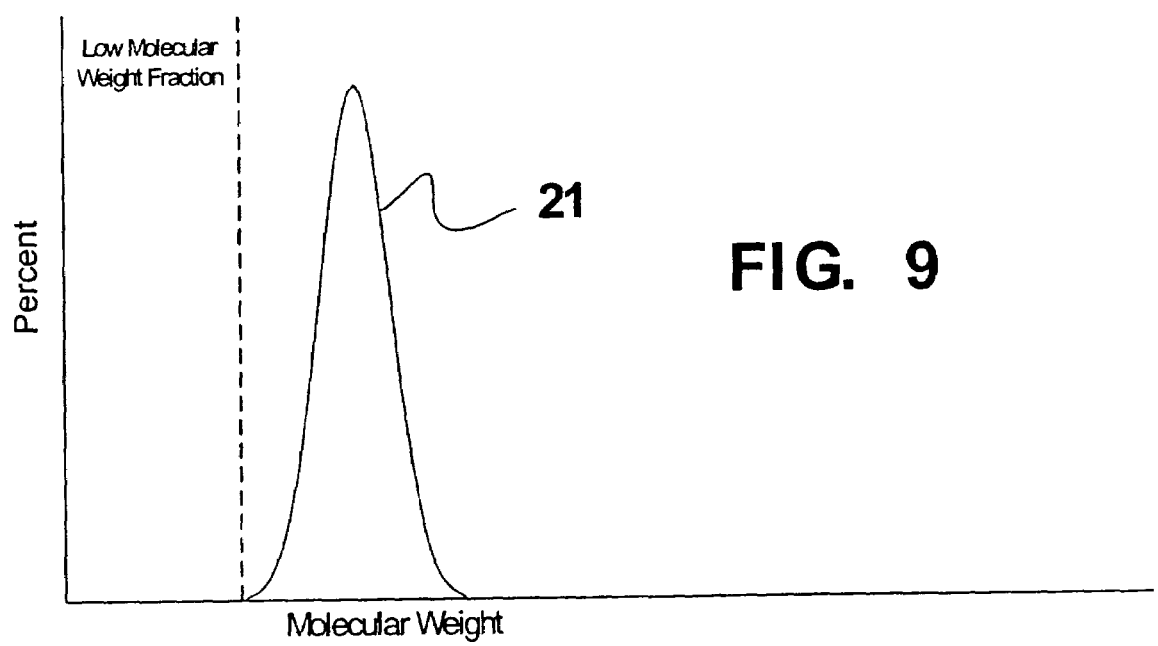
FIG. 9 shows the molecular weight distribution of a LMW HDPE homo-polymer and copolymer.
Figure 10:
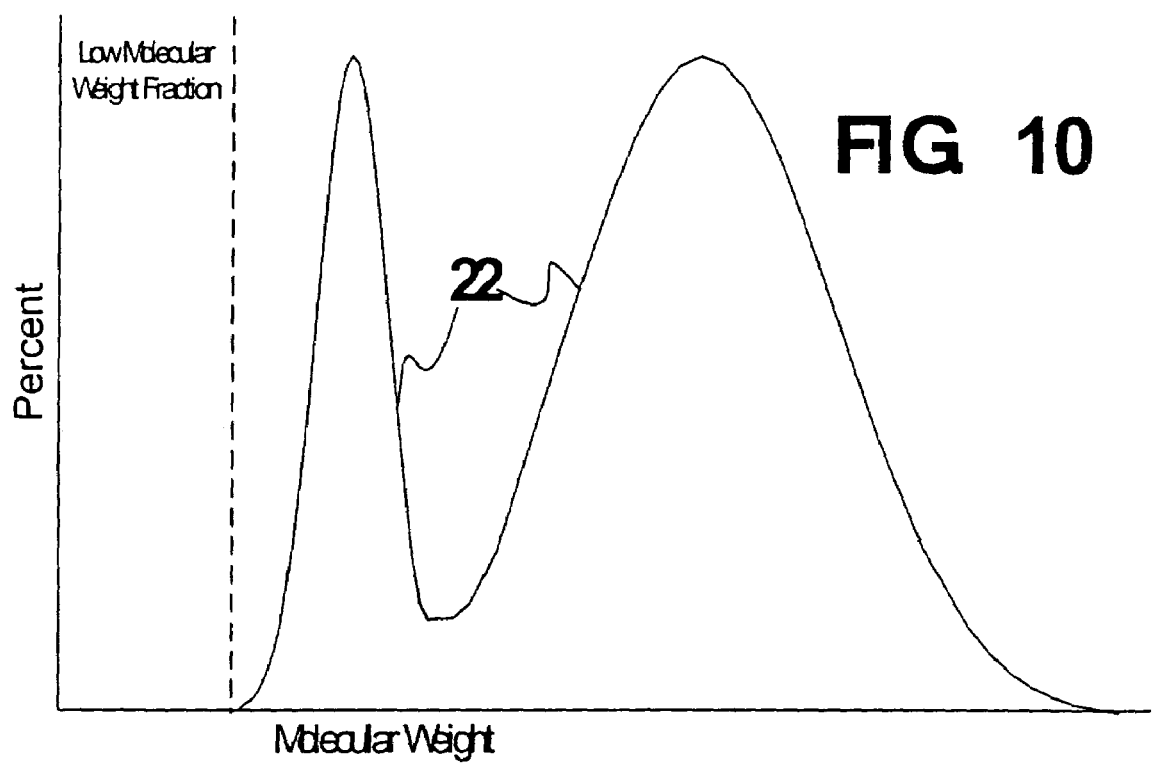
FIG. 10 shows the multi-modal molecular weight distribution of a melt blend of the invention of a film grade typical film grade HMW HDPE and LMW HDPE copolymer and homopolymer.

FIG. 9 shows the molecular weight distribution 21 of a LMW HDPE homo-polymer/copolymer component for a blend to be formulated with other components and blended in accordance with the invention.

To summarize, the invention disclosed herein includes a blend of HDPE resins resulting in a HDPE blend composition that has a number average molecular weight (Mn) in the range of about 25,000 to about 50,000. The blend has a polydispersity index (PI), defined as a ratio of the weight average molecular weight (Mw) to the number average molecular weight (Mn), from about 5 to about 12, and a density of about 0.951 to about 0.954 grams per cubic centimeter. The MI of the blend is in the range of about 0.15 to about 0.35 grams per 10 minutes. The blend has a flexural modulus of at least 180,000 pounds per square inch and ESCR in the range of about 24 to about 500 hours. The ESCR of the blend is measured by an accepted procedure, such as NCTL or NCSL.

The blend includes a component comprising a HMW HDPE copolymer or homopolymer having an MI in the range of about 0.01 to about 0.1 grams per 10 minutes, a density in the range of about 0.945 and about 0.968 grams per cubic centimeter, and a number average molecular weight in the range from about 25,000 grams/mole to about 100,000 grams/mole.

The blend may also include a component comprising a LMW HDPE homopolymer having a density range from about 0.954 to about 0.968 grams per cubic centimeter and an MI value in the range from about 0.1 to about 20.0 grams per 10 minutes. A LMW HDPE copolymer component having a density range from about 0.945 to about 0.954 grams per cubic centimeter and MI value in the range from about 0.1 to about 20.0 grams per 10 minutes may also be included.

At least one LMW HDPE homopolymer having a density range from about 0.954 to about 0.968 grams per cubic centimeter and MI value in the range from about 0.1 to about 20.0 grams per 10 minutes or at least one LMW HDPE copolymer having a density range from about 0.945 to about 0.954 grams per cubic centimeter and MI in the range from about 0.1 to about 20.0 grams per 10 minutes or one LMW HDPE copolymer having a density range from about 0.945 to about 0.954 grams per cubic centimeter and MI in the range from about 0.1 to about 20.0 grams per 10 minutes is added to the first component. At least one of the HMW copolymer or homopolymer HDPE components has a unimodal molecular weight distribution and the HMW copolymer or homopolymer HDPE component has a molecular weight distribution that is either bimodal or multimodal. The LMW homopolymer HDPE component is an injection molding grade HDPE having an MI value from about 1.0 to about 20.0 grams per 10 minutes; the LMW copolymer HDPE component is an injection molding grade HDPE having an MI value from about 1.0 to about 20.0 grams per 10 minutes.

The blend is then used to form single wall, dual wall corrugated and smooth wall polyethylene pipe, fabricated and molded fittings, and accessories. Additives, for example antioxidants, ultra violet stabilizers, carbon black, processing aids, colorants, etc., may be added to the blend prior to forming pipe, fittings and accessories.

The preferred method of determining ESCR's for blended HDPE compositions having similar density and MI values is derived from the formula: $ESCR=Ae^{-B(PI)}$, where $PI=M_w/M_n$; $M_w$=weight average molecular weight, $M_n$=number average molecular weight, and A and B are constants determined from $ESCR=Ae^{-B(PI)}$ and known ESCR and PI values for any two compositions having similar density and MI values. An alternate expression of the same formula is: log ESCR=C(PI)+D, where C is the slope and D is the intercept of a straight line.

The formula is employed in selecting components for a blended polyethylene composition by first determining $M_w$ and $M_n$ of the composition, so that the PI of the composition may be determined by taking the quotient of the sum of the products of weight fraction and $M_w$ of the components and the sum of the products of the weight fraction and $M_n$ of the components to select optimal components suitable for the blended HDPE composition for a given application.

Alternatively, after predetermining the density, MI, and ESCR for the blended polyethylene composition, an HMW HDPE copolymer and at least one LMW HDPE homopolymer or LMW HDPE copolymer are selected as components for the blended composition. Next, the ratio of the selected LMW HDPE homopolymer or copolymer to the selected HMW HDPE component is determined such that the density of the mixture equals the sum of the products of weight fraction and the density of the selected components. The MI value of the mixture is determined from the antilog of the sum of the products of the logarithm of the MI value and the weight fraction of the selected components, and the selected components are blended in the proportions determined.

The blend is then used to form shapes having densities in the range from about 0.951 to about 0.954 grams per cubic centimeter, an MI in the range from about 0.15 to about 0.35 grams per 10 minutes, and a molecular distribution having a ratio of weight average molecular weight to number average molecular weight of in the range from about 5 to about 12.

The preferred blend, when formed into a shape, has a flexural modulus of at least about 180,000 pounds per square inch and ESCR in the range from about 24 to about 500 hours, as measured by standard measurement procedures accepted in the industry, such as, for example, NCTL, NCSL, or other procedures.

In an example, a blended polyethylene composition comprising a HMW HDPE copolymer is produced by 1) predetermining the density and MI for the blended polyethylene composition, 2) selecting a HMW HDPE copolymer as a principal component for the blended composition, 3) selecting at least one of a LMW HDPE homopolymer if the desired density is higher than that of the HMW HDPE, 4) determining the ratio of LMW HDPE homopolymer to HMW copolymer required to obtain the desired density wherein the density of the mixture equals the sum of the products of weight fraction and the density of the components, 5) determining the MI of the mixture of LMW HDPE homopolymer and the HMW copolymer wherein the logarithm of the MI of the mixture equals the antilog of the sum of the products of the logarithm of the MI and the weight fraction of the selected components, 6) selecting a LMW copolymer HDPE having a density value approximately the same as the desired density value for blended polyethylene composition and an MI value sufficiently high or low so that when blended with the mixture of HMW HDPE copolymer and LMW HDPE homopolymer the desired MI for blended polyethylene composition results, 7) determining the amount of LMW copolymer to be added to the HMW copolymer and LMW homopolymer required to attain the desired MI for the polyethylene composition such that the MI of the mixture equals the antilog of the sum of the products of the logarithm of the MI and the weight fraction of the selected components, and 8) blending the selected HMW HDPE, the HMW HDPE copolymer and LMW HDPE homopolymer in the proportions determined.

Another example for preparing a blended polyethylene composition comprising a HMW HDPE copolymer includes: 1) predetermining the density and MI for the blended polyethylene composition, 2) selecting a HMW HDPE copolymer as a principal component for the blended composition, 3) selecting at least one of a LMW HDPE copolymer having an MI higher than the blended polyethylene composition, 4) determining the ratio of LMW HDPE copolymer to HMW copolymer required to obtain the MI such that the MI of the mixture equals the antilog of the sum of the products of the logarithm of the MI and the weight fraction of the selected components, 5) determining the density of the mixture of LMW copolymer and the HMW copolymer wherein the density of the mixture equals the sum of the products of weight fraction and density of the components, 6) selecting a LMW homopolymer having an MI value approximately the same as the MI value desired for the blended polyethylene composition and a density value sufficiently high so that when blended with the mixture of HMW copolymer and LMW copolymer the desired density for blended polyethylene composition is obtained, 7) determining the amount of LMW homopolymer to be added to the amount of HMW copolymer and LMW copolymer required to attain the desired MI for the polyethylene composition wherein the density of the mixture equals the sum of the products of weight fraction and density of the selected components, and 8) blending the selected HMW copolymer, the LMW copolymer and LMW homopolymer in the proportions determined.

In making the blends, transformations of melt rheological properties, such as dynamic mechanical, stress relaxation, viscosity, normal stress, arbitrary strain, stress function perturbation, cosine function, creep, etc., are utilized to determine the weight average molecular weight ($M_w$), the number average molecular weight ($M_n$), and the ratio ($M_w/M_n$).

One skilled in the art is aware that the density of the polyethylene composition is determined by summing of the product of the weight fractions of the component and the component density. One skilled in the art is aware that the MI adds in a log fashion. (See Utracki, L. A. "Melt Flow of Polymer Blends", Polymer Engineering Science 23, 602-609 (1983) and Utracki, L. A. and Kamal, M. R. "Melt Rheology of Polymer Blends," Polymer Engineering Science 22, 96-114 (1982).)

Below is an example in which the method has been applied to formulate a HDPE composition having a density of 0.953 and MI value of 0.2 from components that include a LMW homopolymer, a HMW copolymer, and a LMW copolymer. In this case the HMW copolymer is a wide specification unimodal HDPE copolymer similar to resin 12 in FIG. 6.

EXAMPLE A

|  | Weight Fraction | Density (gm/cm³) | MI (gm/10 min) | Flexural Modulus (psi) | Mn (gm/mole) | Mw (gm/mole) |
| --- | --- | --- | --- | --- | --- | --- |
| LMW homopolymer | 0.412 | 0.962 | 0.623 | 229357 | 37554 | 255000 |
| Unimodal HMW copolymer | 0.464 | 0.945 | 0.037 | 157016 | 23000 | 459000 |
| LMW copolymer | 0.124 | 0.952 | 2.450 | 186804 | 22500 | 143000 |
| HDPE composition | 1.00 | 0.953 | 0.200 | 190500 | 28935 | 335640 |

The weight average molecular weight and the number average molecular weights in this example were determined by summing the products of the weight fractions and molecular weights of the components.

| PI = Mw/Mn | NCTL (hours) | Measured NCTL (hours) |
| --- | --- | --- |
| 11.60 | 31.28 | 34.15 |

The polydispersity index (PI) was calculated from the $M_w$ and $M_n$ of the HDPE composition. The value of the PI was used in conjunction with the algorithm shown in FIG. 11 to obtain the NCTL hours. The value of the measured NCTL hours was obtained from a certified and independent environmental stress crack resistance laboratory under ASTM 5397 procedure.

Figure 7:
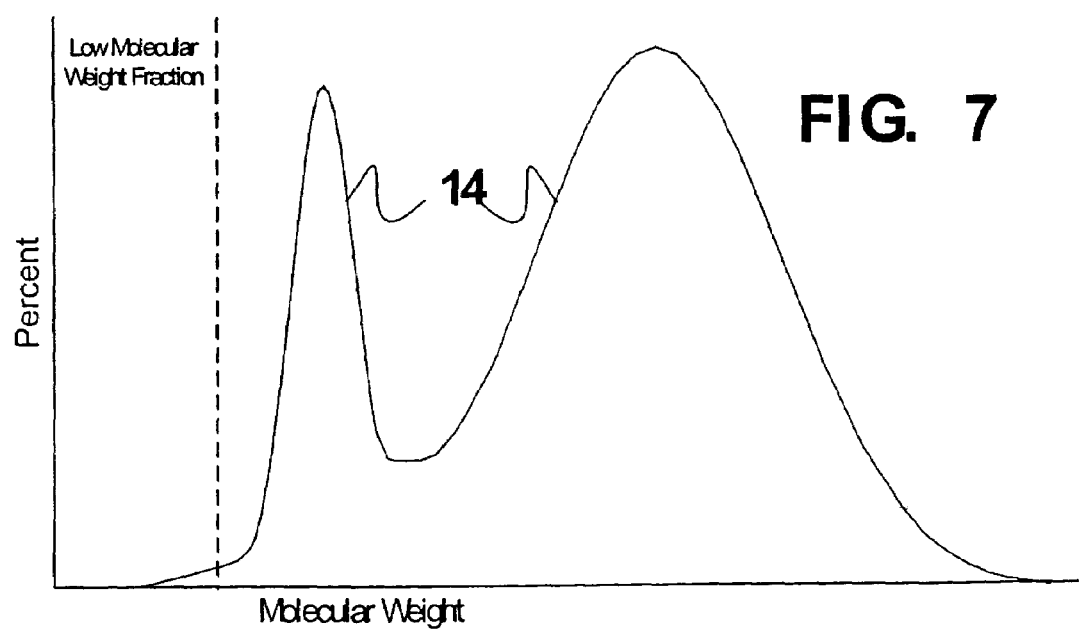
FIG. 7 shows the bimodal molecular weight distribution for a melt blend of the invention of a unimodal HMW HDPE and low molecular weight narrow molecular distribution HDPE.
Figure 8:
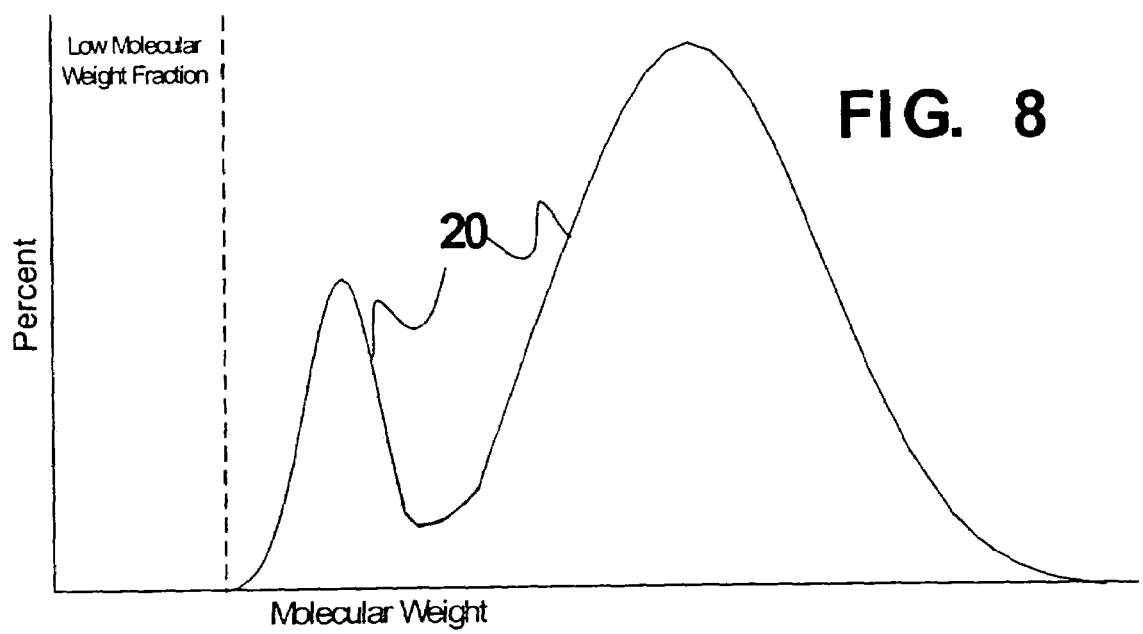
FIG. 8 shows the bimodal molecular weight distribution of a typical film grade HMW HDPE.

An additional embodiment utilizes HMW HDPE having a bimodal molecular weight distribution similar to resin 20 shown in FIG. 8. Such HDPE is available as a commodity in the form of industrial and merchandise bag film grade high-density polyethylene, e.g., Exxon Mobil 7760. The HMW HDPE component having two narrow MWD peaks spaced far apart results in an overall broad MWD. The HMW bimodal copolymer film grade high-density polyethylene, typically, has a density of 0.945 to 0.95 grams per cubic inch and MI values of about 0.01 to 0.1 grams per 10 minutes. HMW weight homopolymers may have values of density from about 0.954 to 0.968. The narrow MWD peaks, being spread far apart, eliminate the very long and the very short molecular species associated with unimodal polyethylene having the same weight average molecular weight. Environmental stress crack resistance of the bimodal HMW HDPE component 14 shown in FIG. 7 is significantly higher than the unimodal HMW HDPE component 12 shown in FIG. 6 having similar MI.

A mixture of low molecular weight HDPE homopolymer and copolymer components is utilized to enhance the processability and the physical properties of the resulting polyethylene composition. A mixture of narrow MWD injection molding grades of HDPE homopolymer, e.g., Equistar M 6580 and HDPE copolymer, e.g., Equistar M 5370 provide the LMW HDPE. The mixture of LMW homopolymer and copolymer 13 is shown in FIG. 6. The bulk of commercially available injection molding grade copolymers have a density of about 0.945 to about 0.954 grams per cubic centimeter and injection grade homopolymers a density of about 0.954 to about 0.968 grams per cubic centimeter and both having MI from about 0.1 to about 20 grams per 10 minutes. Density and MI of the polyethylene composition can be varied independently by adjusting the ratio of the relative amounts of LMW HDPE homopolymer and copolymer and the ratio of the relative amount of the mixture of the LMW HDPE homopolymer and copolymer to amount of the HMW HDPE.

It is preferred that the LMW HDPE homopolymer and copolymer components have significantly higher MI as compared to the unimodal and/or bimodal HMW HDPE copolymer to easily mix with the high viscosity melt and lower MI of the major component. This higher melt index also minimizes the amount of the minor component required to adjust MI of the HMW major component. The ESCR is lower less by utilizing significantly less LMW HDPE having higher MI values of about 1.0 to 20 grams per 10 minutes. The consequence of the increase in the amount of LMW HDPE is large compared to an increase in MI. The use of higher MI values is preferable to adding more LMW HDPE. This relationship is believed to be counter to known conventions in the art.

An example follows that demonstrates the preferred embodiment wherein the ratio of HMW copolymer to LMW weight homopolymer is first determined by density calculations described above and followed by the determination of the amount of LMW copolymer needed to attain the melt flow index desired. This example also utilizing a HMW copolymer with a bimodal molecular weight distribution, injection molding grade LMW homopolymer and injection molding grade LMW copolymer.

EXAMPLE B

| Blend for Density | Weight Fraction | Density (gm/cm) | MI (gm/10 min) | Flexural Modulus (psi) | Mn (gm/mole) | Mw (gm/mole) |
|---|---|---|---|---|---|---|
| LMW homopolymer | 0.143 | 0.965 | 7.7 | 242122 | 17600 | 78800 |
| Bimodal HMW copolymer | 0.857 | 0.951 | 0.05 | 182548 | 56295 | 387782 |
| Blend of LMW homopolymer and HMWcopolymer | | 0.953 | 0.103 | 191059 | 50767 | 343642 |

| Blend for Melt Flow Index | Weight Fraction | MI (gm/10 min) | Density (gm/cm$^3$) | Flexural Modulus (psi) | Mn (gm/mole) | Mw (gm/mole) |
|---|---|---|---|---|---|---|
| Blend of LMW homopolymer and HMWcopolymer | 0.824 | 0.103 | 0.953 | 191059 | 50767 | 343642 |
| LMW copolymer | 0.176 | 4.5 | 0.953 | 191059 | 12400 | 96200 |
| HDPE composition | | 0.2 | 0.953 | 191059 | 44000 | 300000 |

The weight average molecular weight and the number average molecular weights in this example were determined by summing the products of the weight fractions and molecular weights of the components.

| Blend Results | Weight Fraction | PI = Mw/Mn | NCTL (hours) | Measured NCTL (hours) |
|---|---|---|---|---|
| LMW homopolymer | 0.118 | | | |
| Bimodal HMW copolymer | 0.706 | | | |
| LMW copolymer | 0.176 | | | |
| HDPE composition | | 6.82 | 242.45 | 259.98 |

The polydispersity index (PI) was calculated from the $M_w$ and $M_n$ of the HDPE composition. The value of the PI was used in conjunction with the algorithm shown in Figure II to obtain the NCTL hours. The value of the measured NCTL hours was obtained from a certified and independent environmental stress crack resistance laboratory under ASTM 5397 procedure. In the example used to demonstrate the preferred embodiment, a combination of a bimodal HMW copolymer and the injection molding grade LMW homopolymer and copolymer components resulted in about 259 NCTL hours verses about 34 NCTL hours associated with the example that utilized the unimodal HMW copolymer. In both examples the predicted NCTL hours were slightly conservative, i.e. slightly lower than the measured values.

The invention includes polyethylene compositions and methods for HDPE blends having a density in the range of 0.951 to 0.954 grams per cubic centimeter, values of MI according to ASTM D1238 in the range of about 0.15 to about 0.35 grams per 10 minutes, minimum flexural modulus of 180,000 pounds per square inch according to ASTM D790 and tensile strength of 3,000 pounds per square inch according to ASTM D638 and NCTL ASTM D5397 in the range of about 24 to 500 hours. This is accomplished by melt blending at least one HMW HDPE and one LMW HDPE homopolymer or copolymer wherein the components comply with the following criteria:

HMW copolymer or homopolymer HDPE having a density in the range of about 0.945 to about 0.968 preferably a copolymer having density about 0.949 to about 0.953 grams per cubic centimeter and MI values of about 0.01 to about 0.1 more preferably about 0.02 to about 0.075 grams per 10 minutes and a number average molecular weight in the range of about 25,000 to 100,000 grams/mole preferably 30,000 to 60,000 grams/mole.

LMW HDPE homopolymer having a density in the range of about 0.954 or about 0.968 preferably about 0.957 to about 0.961 grams per cubic centimeter and MI of about 0.1 to about 20 preferably about 1 to about 4 grams per 10 minutes having a narrow molecular weight distribution (MWD) as demonstrated by a number average molecular weight in the range of about 10,000 to 50,000 grams/mole.

LMW HDPE copolymer demonstrated by a density in the range of about 0.945 to about 0.954 preferably about 0.95 to about 0.953 grams per cubic centimeters having MI of about 0.1 to about 20 preferably about 1 to about 4 grams per 10 minutes having a narrow molecular weight distribution (MWD) as demonstrated by a number average molecular weight in the range of about 10,000 to 50,000 grams/mole.

Utilizing these criteria and the method described herein provides polyethylene compositions having ESCR values for NCTL test in the range of about 24 to 500 hours HDPE and resulting from HDPE compositions having a polydispersity index (PI=$M_w/M_n$) in the range of about 5 to 12.

Corrugated polyethylene pipe is produced over a broad range of diameters from about 2 inches to about 72 inches. The melt strength of the extruded parison or tube of polymer melt required to form the outer shell of the pipe and the inner liner for dual wall pipe varies with pipe diameter. Melt strength is related to MI. Also the required physical properties of the single wall and dual wall pipe also vary with diameter. Smaller corrugated single wall pipe (about 2 to 10 inch diameter) is typically produced with higher MI polyethylene compositions. The higher MI allows rapid forming and high line speeds. Intermediate dual wall corrugated HDPE pipe (about 12 to about 36 inch diameter) requires a lower MI for increased melt strength to support the larger diameter of the extruded parison or melt tube that is formed into the outer shell or corrugation. The rheological properties (viscosity, MI) ideal for the outer shell differs for the liner due to the need to thermoform the corrugation and thereby stretching the polymer melt.

For the larger diameter corrugated HDPE pipe (about 42 to about 72 inch diameter) the need for lower MI is increased to prevent parison sag. The physical properties of the polyethylene composition, required for the finished corrugated HDPE pipe to pass the low temperature drop weight impact, yield and P11 tests specified by AASHTO, are different depending on the pipe diameter, liner or shell, profile of the corrugation and more. Since the flexural modulus and tensile strength vary directly with the density of the HDPE utilized, varying the density of the polyethylene composition provides the supplier a margin of safety that is often required to compensate to size shape and process variations. The current AASHTO standards require 0.945 to 0.955 grams per cubic centimeter and MI of less than 0.4 grams per 10 minutes.

Since the corrugated HDPE pipe manufacturer produce many different varieties of corrugated pipe, fabricated and molded fittings, there is a variety of MI and density values required. Typical polyethylene compositions utilized to fabricate corrugated HDPE pipe have values of density from about 0.951 to about 0.954 grams per cubic centimeter and values of MI from about 0.15 to about 0.35 grams per 10 minutes.

The following examples were chosen to demonstrate that the method of selecting and blending the HMW HDPE copolymer, LMW HDPE homopolymer and LMW HDPE copolymer provides the corrugated HDPE pipe manufacturer with polyethylene compositions and the means to independently select physical properties and enhance processability and exceed AASHTO's standard for ESCR.

Example 1 requires the polyethylene composition to have a density of 0.952 grams per cubic centimeter and MI of 0.2 grams per 10 minutes.

Example 2 requires the polyethylene composition to have a density of 0.952 grams per cubic centimeter and MI of 0.32 grams per 10 minutes.

Example 3 requires the polyethylene composition to have a density of 0.953 grams per cubic centimeter and MI of 0.2 grams per 10 minutes.

Example 4 requires the polyethylene composition to have a density of 0.953 grams per cubic centimeter and MI of 0.32 grams per 10 minutes.

The four examples were chosen by selecting the four combinations of the limits of density and MI typically utilized by the corrugated HDPE manufacturer. For example both a unimodal and bimodal HMW HDPE copolymer were chosen. The unimodal HMW HDPE utilized is Chevron Phillips Chemical Company HXM 50100-02 having a density of 0.950 grams per cubic centime 10 minutes. The bimodal HMW copolymer utilized as an example is Equistar L5005 having a density of 0.949 grams per cubic centimeter and MI value of 0.06 grams per 10 minutes. However many HMW HDPE copolymers are suitable, a partial list includes: Formosa Plastics Corp. Formolene F904 and F905; Exxon Mobil Chemical Company HD-7760, HO-7745, HO-77-700F and HO 7755; Equistar L4907 and L 4903.

The LMW HDPE homopolymer utilized as an example is Exxon Mobil Chemical Company HD-6908 having a density of 0.962 grams per cubic centimeter and MI of 8 grams per 10 minutes. Other suitable LMW HDPE homopolymers include, but are not limited to: Formosa Plastics Corp. LH6008; Chevron Phillips Chemical Company HiD 9708, HiD 9707D, HiD-9706, HiD 9659 and HiD 9662; Equistar M6580, M6060 and M6030; Dow Chemical Co. Dowlex IP 10262 and Dowlex IP 10; Huntsman Corporation H2105.

The LMW HDPE copolymer used as an example is Formosa Plastics Corp. Formolene LH5212 having a density of 0.952 grams per cubic centimeter and MI of 12 grams per 10 minutes. The following LMW HDPE copolymers are a partial list of alternative LMW HDPE copolymers: Exxon Mobil Chemical Company HD 6706 and HD 6704; Chevron Phillips Chemical Company HiD 9012, HiD 9004 and HiD 9006; Formosa Plastics Corp. Formalene LH5204 and LH5206; Equistar M5370 and M5350; and Dow Chemical Company Polyethylene 04452N.

In each example, the desired density was utilized to determine the ratio of the LMW HDPE homopolymer to the HMW HDPE copolymer. This is accomplished with the linear density relationship described above wherein the density of a mixture equals the sum of the product of the weight fraction and the density of each component. The MI of the LMW HDPE homopolymer and HMW copolymer was determined and the ratio of the amount of LMW HDPE copolymer to the combined amount of the LMW HDPE homopolymer and HMW copolymer was determined for the polyethylene composition to have the desired MI.

The results shown in the table below represent the application of the method described herein in which the density and MI values represent the HDPE compositions and the weight percent values represent the recipe. The NCTL ESCR hours determined by the polydispersity—ESCR algorithm shown in FIG. 11, the $M_w$ and $M_n$ were obtained by rheological transform utilizing dynamic mechanical moduli and confirmed to be accurate by measuring directly the ESCR. These examples demonstrate the capability of the disclosed methods to be utilized for controlling the ESCR of HDPE compositions before fabrication into pipe and quality assurance of ESCR on the finished pipe, fittings, and accessory products.

TABLE I

| Density (gm/cm³) | MI (gm/10 min) | Weight % HMW Copolymer | Weight % LMW Copolymer | Weight % LMW Homopolymer | NCTL ESCR (hours) |
|---|---|---|---|---|---|
| Unimodal HMW copolymer blended with LMW homopolymer and copolymer | | | | | |
| 0.952 | 0.2 | 67.8 | 21.8 | 10.4 | 102 |
| 0.952 | 0.32 | 57.6 | 33.5 | 8.9 | 105 |
| 0.953 | 0.2 | 68.6 | 14.3 | 17.1 | 107 |
| 0.953 | 0.32 | 58.2 | 27.2 | 14.6 | 110 |
| Bimodal HMW copolymer blended with LMW homopolymer and copolymer | | | | | |
| 0.952 | 0.2 | 69.8 | 24.8 | 5.4 | 234 |
| 0.952 | 0.32 | 59.3 | 36.1 | 4.6 | 230 |
| 0.953 | 0.2 | 70.6 | 17.6 | 11.8 | 242 |
| 0.953 | 0.32 | 59.9 | 30.1 | 10.0 | 238 |

Figure 12:
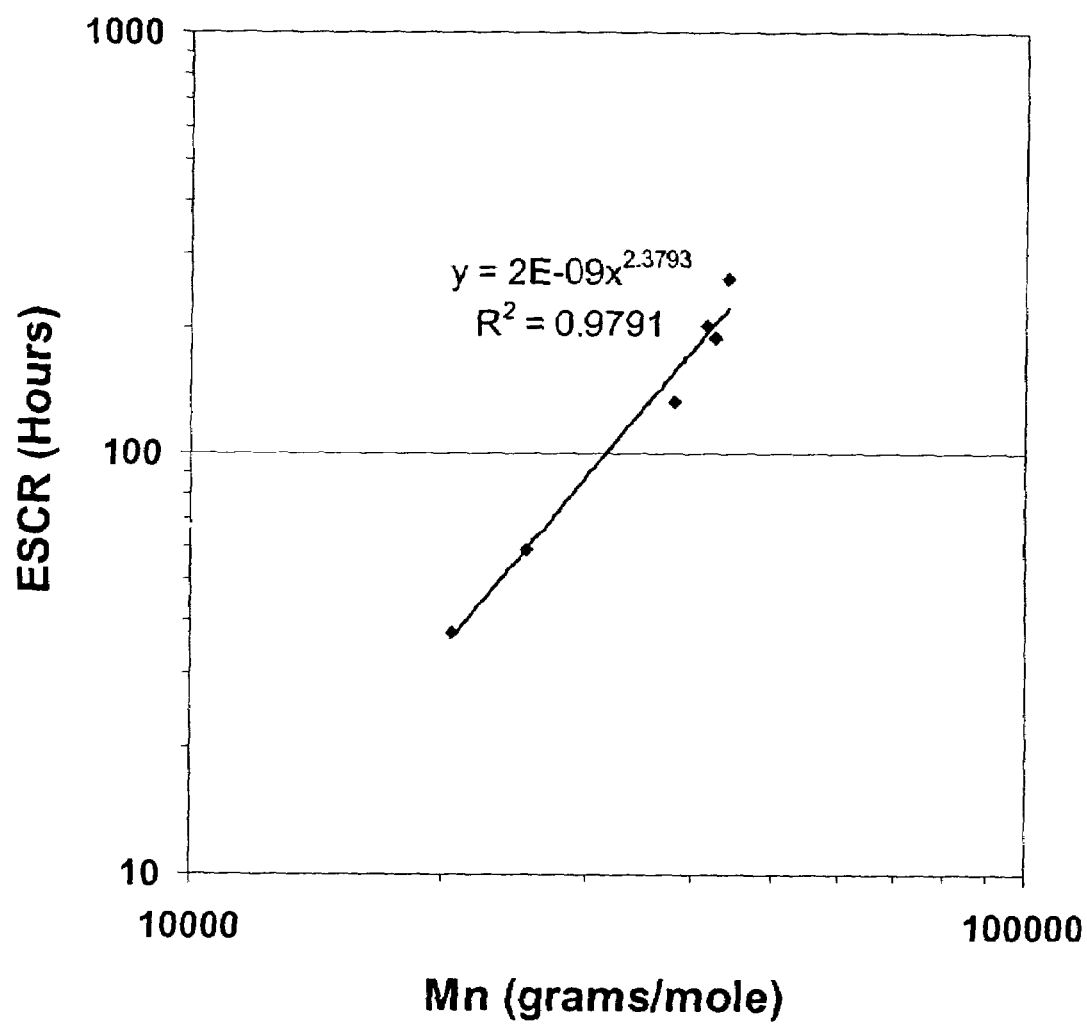
FIG. 12 shows a log-log relationship between the ESCR and the number average molecular weight for six HDPE blends.

FIG. 12 shows an example of a plot of six high density polyethylene compositions below and demonstrates the invention disclosure that the logarithm of the slow crack growth failure time (ESCR) of polyethylene compositions having approximately the same density and different molecular weights are directly proportional or linearly increase with the logarithm of the values of number average molecular weight ($M_n$) of the polyethylene compositions. The values of ESCR were measured utilizing the NCTL ASTM D5397 procedure but the relation is valid for the values of the ESCR determined by other methods including but not limited to ASTM F1473, D1598, D2837 and F2136.

| Sample Number | Density (grams/cm³) | Measured NCTL (Hours) | Mn |
|---|---|---|---|
| 1 | 0.953 | 188.8 | 42,400 |
| 2 | 0.953 | 58.9 | 25,200 |
| 3 | 0.953 | 202.5 | 41,600 |
| 4 | 0.953 | 37.5 | 20,600 |
| 5 | 0.953 | 260.0 | 44,000 |
| 6 | 0.953 | 134.0 | 38,100 |

The density varies with degree of crystallinity. Therefore, to obtain a control for the morphology of the six HDPE compositions, the density was held constant. Because the environmental stress crack resistance is generally understood and accepted by the scientific community to depend on the morphology or more specifically the degree of crystallinity was relationship to molecular weight and molecular weight distribution was determined. The relationship between the ESCR and the number average molecular weight $M_n$ was found to have an exponential or power law relationship as demonstrated in FIG. 12 and is expressed by the following ESCR-$M_n$ algorithm:

$$ESCR = EM_n^F$$

where $M_n$=number average molecular weight; and E and F are constants determined from $ESCR=EM_n^F$ and known ESCR and $M_n$ values for any two compositions having similar density. Said ESCR-$M_n$ algorithm applies to all linear polyethylene resins and blend compositions. Linear polyethylene include all high density polyethylenes (HDPE), medium density polyethylenes (MDPE) and linear low density polyethylenes (LLDPE).

Since the number average molecular weight, $M_n$, of a polymer composition is equal to sum of the product of the weight fraction and the number average molecular weight of each component; the ESCR-$M_n$ algorithm: $ESCR=EM_n^F$ discloses the mixing rule for ESCR. The $M_n$ is the number average molecular weight and varies mainly with length of smaller molecules of the distribution of polymer molecules. The higher number average molecular weight, $M_n$, correspond to lower numbers of small molecules in the distribution. The weight average molecular weight, Mw, the Z average molecular weight, Mz and the Z+1 average molecular weights are respectively more indicative of higher molecular weight components. The polydispersity index (PI=$M_w/M_n$) is used as a measurement of the width of the molecular weight distribution and has long been utilized by those skilled in the art of polymer science as an indicator of process ability. The higher the polydispersity index (PI=$M_w/M_n$) of polymers the broader the molecular weight distribution and the easier to process. The preferred embodiment of this invention utilizes the ESCR-$M_n$ algorithm: $ESCR=EM_n^F$ because the number average molecular weight of the blend composition can be calculated a priori from the number average molecular weight of the blend components, the ESCR-$M_n$ algorithm is independent of the weight average molecular weight and provides the means to predict ESCR of low, medium and high molecular weight polyethylenes. This method is applicable to all linear polyethylene blend components and their resulting polyethylene blend compositions having density values approximately the same. In other words, the ESCR-$M_n$ algorithm can be applied to linear low, medium and high density polyethylene component resins and blends.

An example of a Bi-Component and a Tri-component blend wherein the constants A and B were calculated from the data depicted in FIG. 12 is shown below.

EXAMPLE C

| | Weight Fraction | Density (gm/cm³) | MI (gm/10 min) | Mn (gm/mole) | Mw (gm/mole) |
|---|---|---|---|---|---|
| HMWcopolymer | 0.485 | 0.944 | 0.060 | 34,200 | 510,000 |
| LMW Homopolyer | 0.515 | 0.962 | 0.623 | 37,600 | 255,000 |
| HDPE composition | 1.00 | 0.9533 | 0.200 | 35,951 | 378,675 |

PI = Mw/Mn = 10.53
ESCR = 138 hours (NCTL)

EXAMPLE D

| | Weight Fraction | Density (gm/cm³) | MI (gm/10 min) | Mn (gm/mole) | Mw (gm/mole) |
|---|---|---|---|---|---|
| HMW HDPE | 0.486 | 0.950 | 0.020 | 32,400 | 533,400 |
| LLDPE | 0.256 | 0.936 | 1.137 | 37,000 | 128,000 |
| LMW MDPE | 0.258 | 0.945 | 2.740 | 25,500 | 101,600 |
| HDPE composition | 1.00 | 0.945 | 0.200 | 31,797 | 318,213 |

PI = Mw/Mn = 10.01
ESCR = 103 hours (NCTL)

The ESCR values predicted from the number average molecular weight, $M_n$, Of Example C having only HDPE components and Example D having medium density polyethylene (MDPE) and linear low density polyethylene (LLDPE) components both resulted in enhanced ESCR values. These ESCR values are representative of the experimental results as determined in accordance with ASTM 5397. The polydispersity index (FI) indicate the breadth of the distribution and the processability of the blended composition.

Having described the invention in detail, those skilled in the art will appreciate that, given the present disclosure; modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

What is claimed is:

1. A HDPE blended composition comprising at least two components wherein the number average molecular weight (Mn) of the blended composition is in the range from about 25,000 to about 50,000 grams per mole and wherein the first component is a low molecular weight (LMW) linear polyethylene and a second component is a high molecular weight (HMW) high density polyethylene (HDPE).

2. The HDPE blended composition of claim 1 wherein the said first component has a melt index (MI) from about 1.0 to about 20 grams per 10 minutes.

3. The HDPE blended composition of claim 1 wherein at least one of said components is selected from the group of virgin pellets, recycled, reprocessed, regrind, off specification, and wide specification grades of polyethylene or combinations thereof.

4. The HDPE blended composition of claim 1 wherein said blend contains a major portion of HDPE and minor amounts of LLDPE or MDPE.

5. The HDPE blended composition of claim 1 wherein said first component is linear low density, medium density or high density polyethylene.

6. The HDPE blended composition of claim 1 wherein said second component has a number average molecular weight (Mn) in the range from about 25,000 grams/mole to about 100,000 grams/mole.

7. The HDPE blended composition of claim 1 wherein the blend composition has a crack resistance notched constant tensile load (NCTL) or notched constant load stress (NCLS) value in the range of about 24 hours to about 500 hours.

8. The HDPE blended composition of claim 1 wherein said second component has an MI range of about 0.01 to about 0.1 grams per 10 minutes and a density in the range of about 0.945 to about 0.968 grams per cubic centimeter.

9. The HDPE blended composition of claim 1 wherein the molecular weight distribution of said second component is selected from the group consisting of a unimodal distribution, bimodal distribution and a multimodal distribution.

10. The HDPE blended composition of claim 1 wherein the number average molecular weight (Mn) of the blend composition is determined from a transformation of a rheological property of the blended composition.

11. The HDPE blended composition of claim 10 wherein the rheological properties transformed are derived from measurements selected from the group consisting of dynamic mechanical, stress relaxation, viscosity, normal stress, arbitrary strain, stress function perturbation, cosine function, and creep.

12. A HDPE blended composition comprising at least two components wherein the first component is a low molecular weight (LMW) linear polyethylene having a melt index (MI) from about 1.0 to about 20 grams per 10 minutes, wherein said first component is linear low density (LLDPE), medium density (MDPE) or high density (HDPE) polyethylene and a second component is a high molecular weight (HMW) HDPE, wherein said blend contains a major portion of HDPE and only minor amounts of LLDPE and wherein at least one of said components is selected from the group of virgin pellets, recycled, reprocessed, regrind, off specification, and wide specification grades of polyethylene or combinations thereof.

13. The HDPE blended composition of claim 12 wherein the number average molecular weight of the composition is in the range from about 25,000 to about 50,000 grams per mole or higher.

14. The HDPE blended composition of claim 12 wherein said second component has a number average molecular weight (Mn) in the range from about 25,000 grams/mole to about 100,000 grams/mole.

15. The HDPE blended composition of claim 12 wherein said second component has an MI range of about 0.01 to about 0.1 grams per 10 minutes and a density in the range of about 0.945 to about 0.968 grams per cubic centimeter.

* * * * *